United States Patent
Schlee et al.

(10) Patent No.: US 8,960,339 B2
(45) Date of Patent: Feb. 24, 2015

(54) MECANUM WHEEL

(71) Applicant: Helical Robotics, LLC, Oregon, WI (US)

(72) Inventors: Keith L. Schlee, Oregon, WI (US); Bruce A. Schlee, Oregon, WI (US)

(73) Assignee: Helical Robotics, LLC, Oregon, WI (US)

( * ) Notice: Subject to any disclaimer, the term of this patent is extended or adjusted under 35 U.S.C. 154(b) by 0 days.

(21) Appl. No.: 13/838,818

(22) Filed: Mar. 15, 2013

(65) Prior Publication Data
US 2013/0292918 A1 Nov. 7, 2013

Related U.S. Application Data

(60) Provisional application No. 61/642,247, filed on May 3, 2012.

(51) Int. Cl.
| | |
|---|---|
| B62D 57/00 | (2006.01) |
| B60B 19/12 | (2006.01) |
| B62B 3/00 | (2006.01) |
| B60B 3/00 | (2006.01) |
| B60B 3/08 | (2006.01) |
| B60B 19/00 | (2006.01) |
| B60B 3/10 | (2006.01) |

(52) U.S. Cl.
CPC . *B60B 19/12* (2013.01); *B62B 3/00* (2013.01); *B60B 3/002* (2013.01); *B60B 3/085* (2013.01); *B60B 19/003* (2013.01); *B60B 3/10* (2013.01); *B62B 2301/02* (2013.01)

USPC .......................................................... 180/7.1

(58) Field of Classification Search
USPC ................. 280/5.514, 6.517, 6.15, 5.507; 301/5.23, 1, 5.1, 9.2, 40.6, 45, 46, 50, 301/52, 43, 104; 16/29, 30, 40
See application file for complete search history.

(56) References Cited

U.S. PATENT DOCUMENTS

| | | | |
|---|---|---|---|
| 7,980,335 B2 * | 7/2011 | Potter | 180/7.1 |
| 8,011,735 B2 * | 9/2011 | Scogna et al. | 301/5.23 |
| 2010/0187779 A1 * | 7/2010 | Potter | 280/5.514 |

OTHER PUBLICATIONS

Zipp, Kathleen, "Helical Robotics Can Help Service Turbines," Windpower Engineering Development, Sep. 27, 2011, retrieved from http://www.windpowerengineering.com/construction.installation/helical-robotics-can-help-service-turbines/ on Nov. 24, 2014, 3 pages.

* cited by examiner

*Primary Examiner* — John Walters
*Assistant Examiner* — James Triggs
(74) *Attorney, Agent, or Firm* — Fredrikson & Byron, P.A.

(57) ABSTRACT

A Mecanum wheel having a circular plate with a plurality of peripheral flanges formed thereon, the flanges having tab portions bent at an angle of less than 90° from said plate; a roller being mounted to and cantilevering off of each of said tab portions such that the axis of rotation of each roller is at corresponding angle of less than 90° from said plate. In some cases, the angles are approximately the same, being approximately 45°. By cantilevering the rollers, more space is available for use by machines using this Mecanum wheel design.

23 Claims, 8 Drawing Sheets

-45 Deg Plate Shown

10a

+45 Deg Plate Shown

+45 Deg Plate Shown

+45 Deg Plates Shown

MECANUM WHEEL

CROSS-REFERENCE TO RELATED APPLICATION

This patent application claims priority to provisional U.S. patent application Ser. No. 61/642,247, filed on May 3, 2012, the entire contents of which are hereby incorporated by reference herein.

FIELD OF THE INVENTION

The present invention relates to Mecanum wheels.

BRIEF SUMMARY OF THE INVENTION

A Mecanum wheel comprising a circular plate having a plurality of peripheral flanges formed thereon, each having tab portions bent at an angle of less than 90° from said plate; a roller being mounted to and cantilevering off of each of said tab portions such that the axis of rotation of each roller is at corresponding angle of less than 90° from said plate. In some cases, these angles are approximately the same, being approximately 45°. By cantilevering the rollers, more space is available for use by machines using this Mecanum wheel design. These and other features and objects of the invention will be more fully set forth in the Description of the Preferred Embodiments.

DESCRIPTION OF THE PREFERRED EMBODIMENTS

Figure 1:
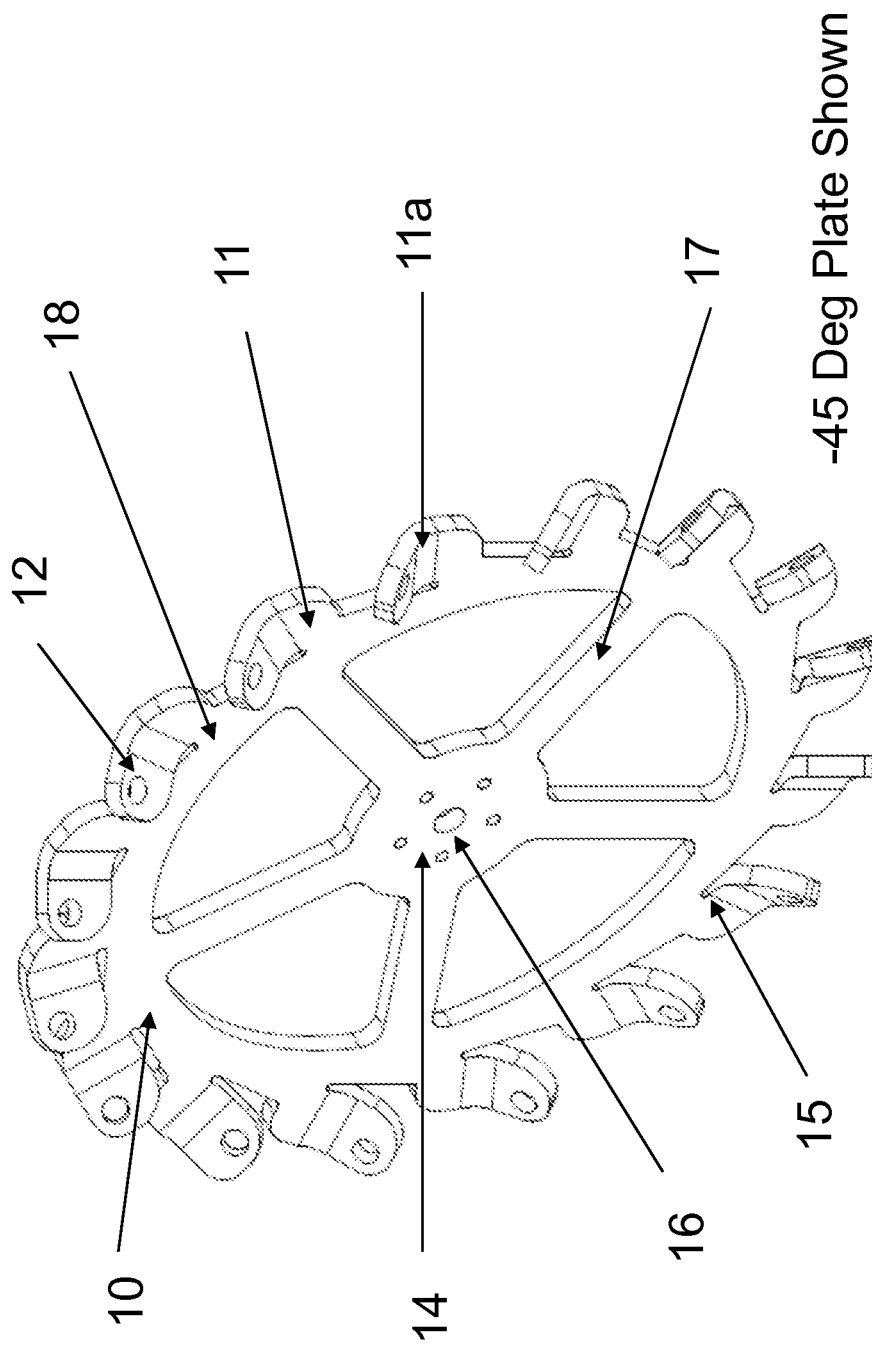
FIG. 1 is a perspective view of an exemplary circular plate of Mecanum wheel in accordance with certain embodiments of the invention.

In certain embodiments, the Mecanum wheel 1 (FIGS. 5 and 6) involves a circular plate 10 (FIG. 1) having a plurality of peripheral flanges 11 upon which rollers 30 (FIG. 4) are mounted in cantilevered fashion. As exemplarily shown, the circular plate 10 features a five-hole hub mount interface 14 with a central opening 16 for receiving an axle or bearing and to aid in the plate manufacture. As further shown, five spokes 17 radiate outwardly from hub interface 14 and are joined to a peripheral ring 18. However, it should be appreciated that more or less spokes or hub mount interface holes may be added or subtracted to the plate, depending on wheel loading conditions.

The flanges 11, as shown, project radially from the outer periphery of ring 18, and are bent at an angle of less than 90° to the plane of plate 10, to form a tab portion 11a. As alluded above, the tab portions 11a are bent at such angle such that the rollers 30 mounted thereto can be provided in cantilevered orientation. In certain embodiments, the angle is less than 60°. In more preferable embodiments, the angle is approximately 45°; however, the invention should not be limited to such. To that end, while the angle may be referenced hereinafter as 45° (or −45° as further described below), this is not for limiting effect.

Figure 2:
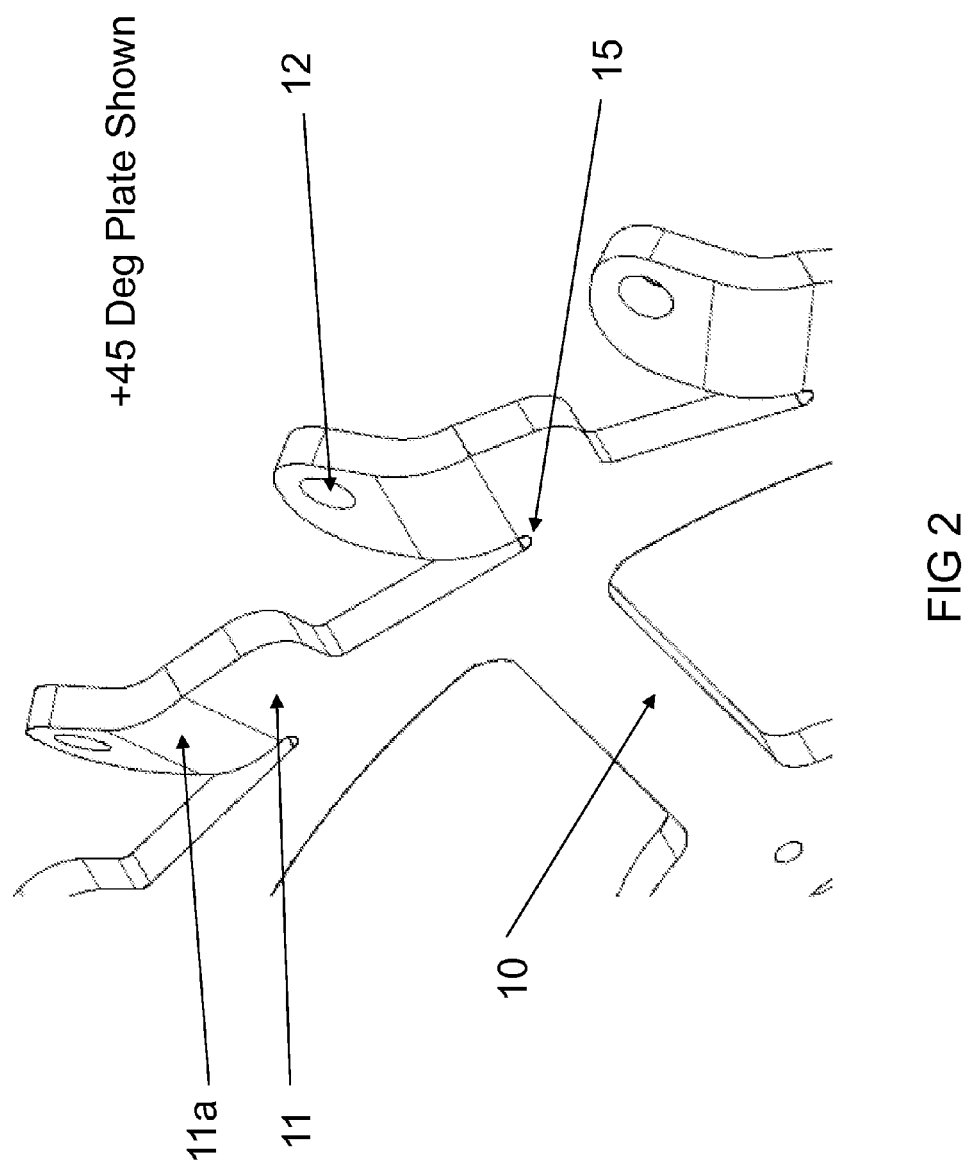
FIG. 2 is a fragmentary perspective view of a portion of the periphery of the circular plate of FIG. 1 with tab portions thereof having alternate bend in accordance with certain embodiments of the invention.
Figure 7:
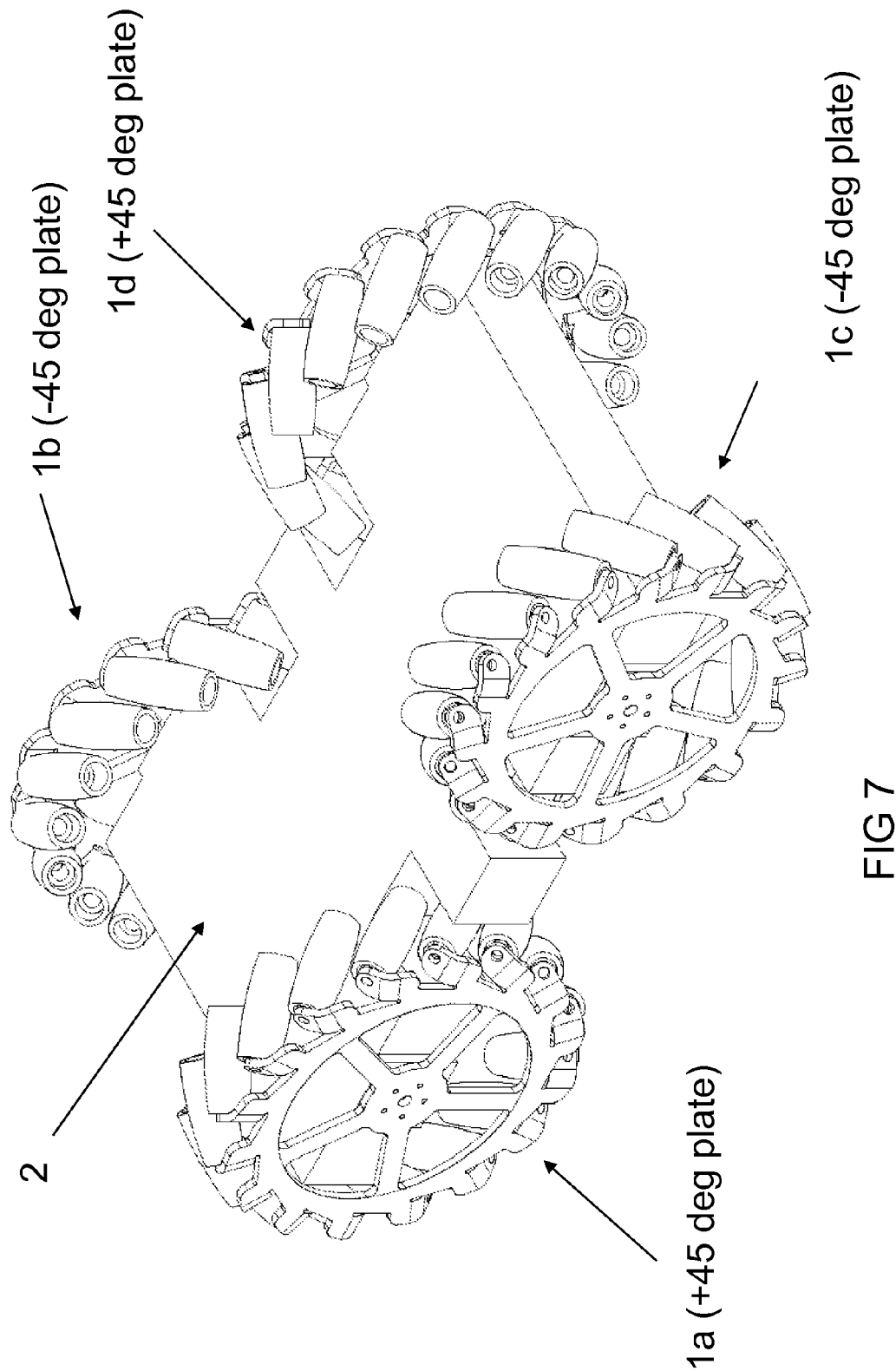
FIG. 7 is a perspective view of a mobile unit equipped with a matched set of Mecanum wheels in accordance with certain embodiments of the invention.

In certain embodiments, a matched set of four Mecanum wheels 1 for a mobile unit 2 dictates that two of the wheels be made with flange tabs 11a bent (e.g., approximately 45°) in one direction relative to the plane of plate 10, and two wheels be made with tabs 11a similarly bent (e.g., approximately 45°) in an opposing direction relative to the plane of plate 10 (FIG. 7). Thus, as shown in FIG. 1, flange tabs 11a of two of the four Mecanum wheels are bent in one direction relative to the plane of plate 10, and as shown in FIG. 2, the other two Mecanum wheels are bent in the opposing direction. Continuing with this, if the tabs 11a for these plates were bent to 45° angles, the plate exemplified in FIG. 1 could thus be referred to as a "−45°" plate, while that exemplified in FIG. 2 can be referred to as a "+45°" plate.

Figure 3:
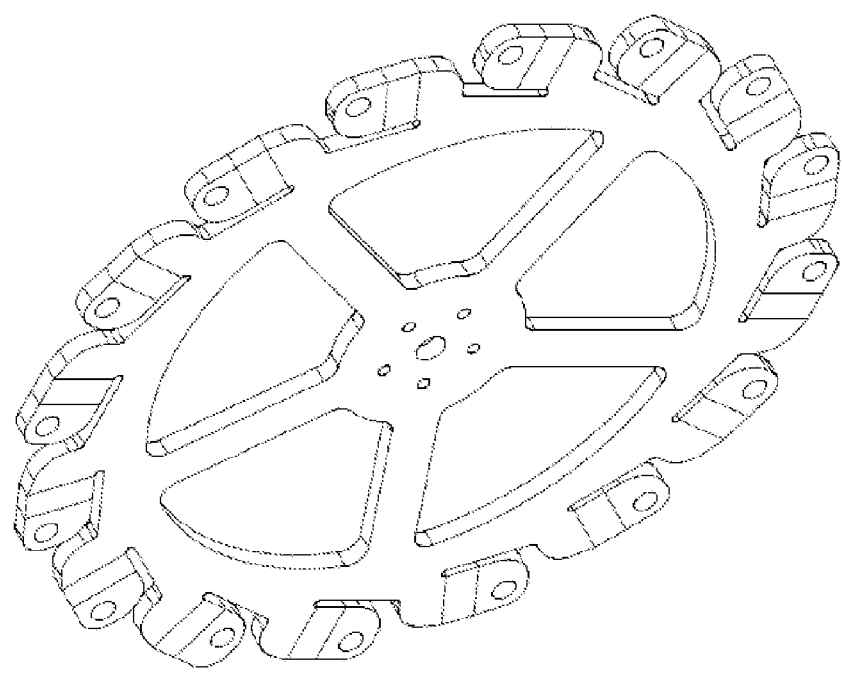
FIG. 3 is a perspective view of an unbent blank for the circular plate of FIG. 1 in accordance with certain embodiments of the invention.

Plate 10, in certain embodiments, is made of aluminum or other bendable material, having a requisite thickness (e.g., the plates of the figures have 3/16" thickness). In certain embodiments, the plate can be stamped from sheet or plate. In a large enough stamping die, or in a progressive die, the final plate can be cut and bent in the shape shown, entirely in the stamping operation. Alternately, plate 10 can be machined or cut in various steps and/or ways, particularly if the material is susceptible to cracking when deformed during stamping. For example, water or laser cutting can be used to cut a flat blank 10a out of a flat plate of aluminum or other metal (FIG. 3). Continuing with the examples described above, a press can then be used to bend the flange tabs 11a either in the "+45°" direction or "−45°" direction.

It should be appreciated that the plate 10 can just as well be stamped from other metals, machined, or can be molded of a plastic or moldable metal material. To facilitate more accurate tolerances and to ease manufacture, the tabs, hub interface, and all other cutouts may be defined before bending or stamping. If more strength is desired and the material allows, plate 10 can be heat treated after flange tabs 11a are formed. Plate 10 can optionally be anodized, polished, or powder coated after forming to get the desired finish.

As described above, projecting from the outer perimeter of ring 18 of circular plate 10 are the flanges 11. Flanges 11 include tab portions 11a projecting laterally therefrom, and are separated in part from peripheral ring 18. As described above, the tabs 11a are bent at an angle of less than 90° (e.g., approximately 45°) with respect to the plane of plate 10. They are formed in such a way that a gap 15 is present between the circular plate 10 and the bent portion 11a of tab 11 (FIG. 2). This provides stress relief which extends wheel life and eases manufacture. Flanges 11 also have hole 12 defined in bent tab portion 11a, which allows the rollers 30 to be attached to the plate 10.

Attached to each tab 11a of each flange 11 is a roller 30, the main body of which can be made of polyurethane. The rollers 30 can be made from molds in order to accommodate large volume production. As described above, one material for the rollers can be polyurethane, but other moldable materials or combinations of such materials may alternately be used. The rollers 30 have certain length and diameter based on diameter of the wheel. For example, in certain embodiments, for a 16 roller 9.0 inch diameter wheel, each roller 30 may preferably have a length of about 2.3 inches and a diameter of about 1.0 inch, while further having a hardness of 80-100 Shore A. As is well understood in the art, the roller length and diameter may be adjusted as needed to account for different wheel diameters, but may also be adjusted based on quantity of rollers used.

Figure 4:
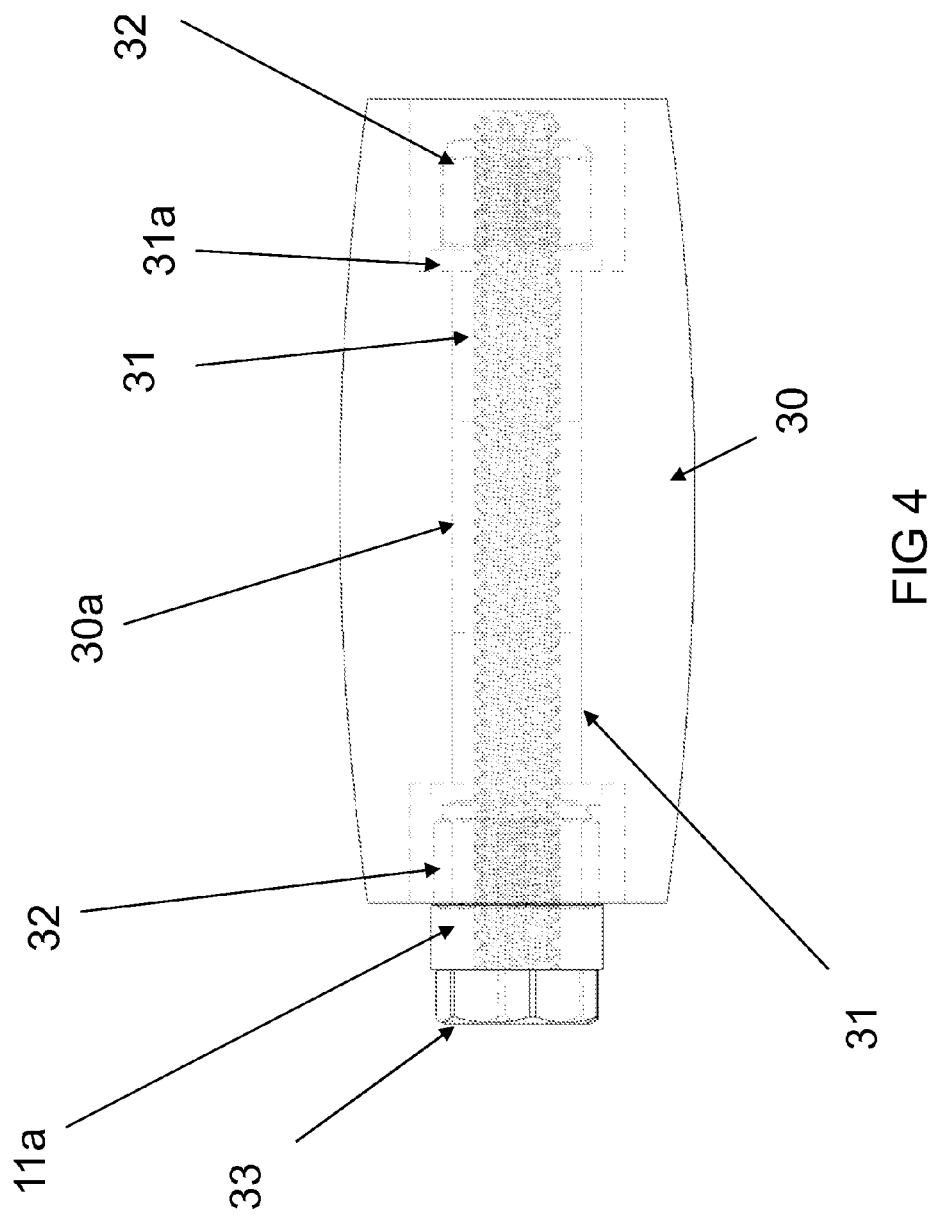
FIG. 4 is an elevation view of a roller as fixated to the circular plate of FIG. 1 in accordance with certain embodiments of the invention.

With reference to FIG. 4, the rollers 30 can be secured to the flange tabs 11a in any of a variety of coupling means, e.g., by a bolt 33, passing through the opening 12 in flange tab 11a, and threaded through a lock nut 32. As shown, in such example, the bolt 33 can pass through two sleeve bearings 31 on the interior of roller 30 and into a cavity 30a in the end of roller 30. An exemplary material for bolt 33 is steel or aluminum. A lock nut 32 of material matching the bolt can be threaded over the protruding end of bolt 33, so as to nest down inside cavity 30a. The sleeve bearings 31 can be held against sliding by sleeve bearing flanges 31a which project annularly outwardly from the outside ends of sleeve bearings 31. Exemplary materials for the sleeve bearings are bronze or plastic.

As alluded to above, rollers 30 project in cantilevered fashion from tabs 11a of flanges 11, as a result of the tabs 11a being bent at an angle of less than 90° (e.g., of approximately 45°) with respect to the plane of the plate 10. Thus, the rollers 30 also project at an angle of less than 90° (e.g., of approximately 45°) with respect to the perpendicular plane of plate 10. The skilled artisan would recognize that the increase of one of these angles (e.g., with regard to the tabs 11a) leads to a corresponding decrease in the other angle (e.g., with regard to the axis of rotation of the rollers 30), and vice versa. For example, if the angle of the tabs 11a were 60° with respect to the plane of the plate, the corresponding angle of the rollers 30 would be 30° with respect to the perpendicular plane of the plate (i.e., the angle of the tabs 11a subtracted from 90°). Applicants have found when these angles are about the same (i.e., approximately 45°), the constructions can provide advantages in the application of mobile devices; however, the invention should not be limited to such angles or applications.

Figure 5:
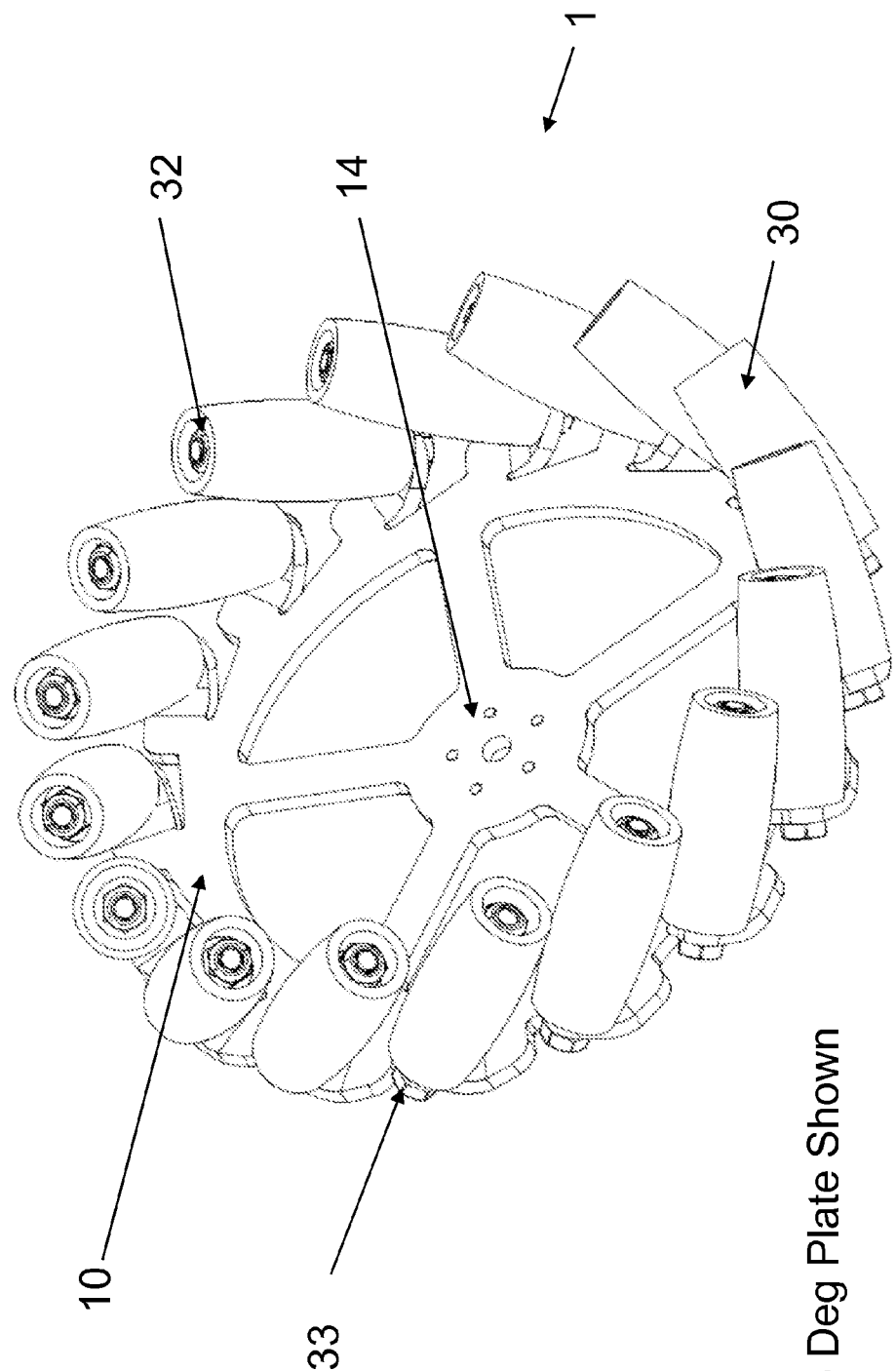
FIG. 5 is a perspective view of an exemplary Mecanum wheel using the circular plate of FIG. 2 in accordance with certain embodiments of the invention.
Figure 6:
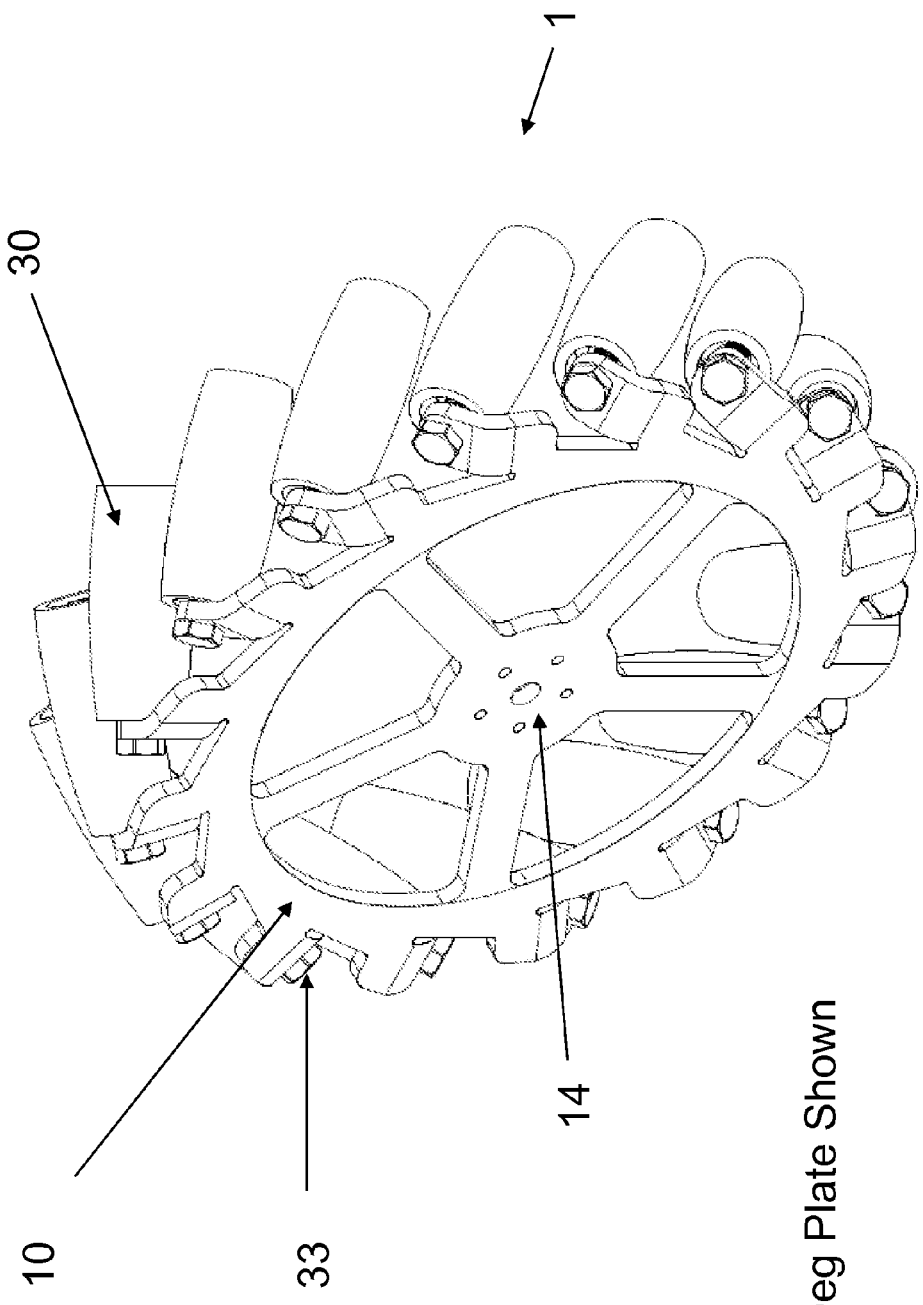
FIG. 6 is a perspective view of the Mecanum wheel of FIG. 5 as observed from an opposing side of the wheel.

The material of flanges 11 must be sufficiently strong and stiff that rollers 30 do not flex so as to interfere with one another or permanently deform flange 11. FIG. 5 shows an exemplary embodiment of a Mecanum wheel with rollers 30 projecting "out of the page," while FIG. 6 shows the opposite face of plate 10 such that rollers 30 project "into the page."

Figure 8:
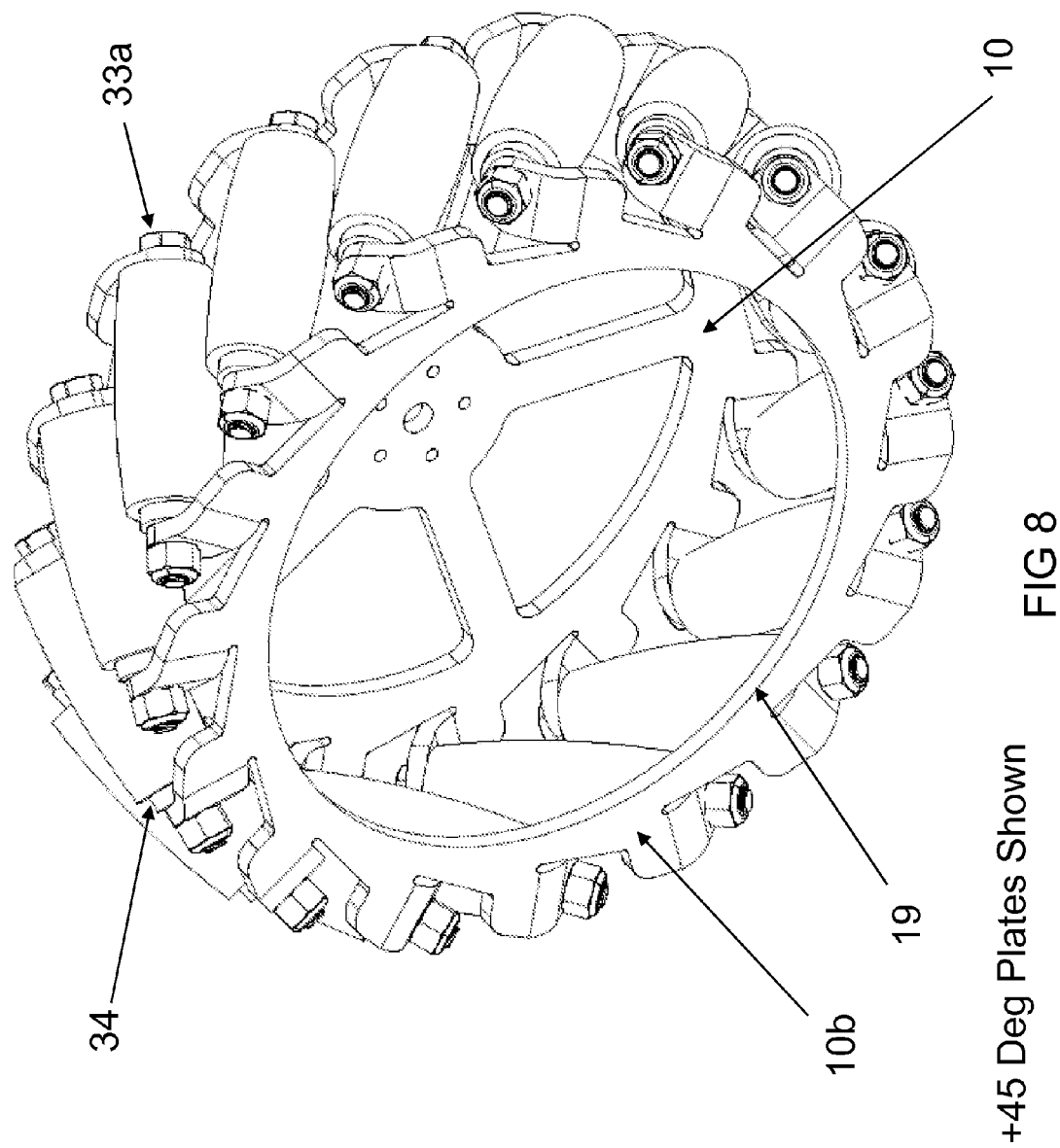
FIG. 8 is a perspective view of another Mecanum wheel with reference to FIGS. 5 and 6 in accordance with certain embodiments of the invention.

Certain applications may require more strength in flanges 11. As such, FIG. 8 shows an alternative embodiment in which a further plate 10b is used. In certain embodiments, as shown, the further plate 10b is similar in design to the plate 10 (e.g., being circular and having a plurality of flanges arranged about its periphery), but the hub mount 14 and spokes 17 are substituted with a ring opening 19. Use of the further plate 10b allows a plurality of rollers 30 to be jointly cantilevered between plates 10 and 10b. It should be appreciated that this construction allows for greater overall strength of the Mecanum and reduces potential deflection of the flanges 11 of the plates 10, 10b (and corresponding defection of the rollers 30 supported there between. As shown, in certain embodiments, the flange 11 geometry and construction of the further plate 10b can be the same to that of plate 10. For example, the plates 10, 10b have corresponding quantities of flanges 11 and tabs 11a protruding therefrom; however, the invention should be limited to such. For example, the further plate 10b, in certain embodiments can include less than the quantity of flanges 11 of plate 10, whereby only certain of the rollers 30 extending from plate 10 are connected to corresponding flanges 11 (and bent tabs 11a) of the further plate 10b. With reference to FIG. 8, one exemplary case can be that the further plate 10b has two or more flanges 11 each supporting a correspondingly one of the rollers 30 extending from plate 10. For example, the further plate 10b can have at least half as many flanges 11 as plate 10, and these flanges 11 of the further plate 10b can be uniformly distributed over the periphery of the further plate 10b so that corresponding rollers 30 extending from plate 10 are supported by the further plate 10b (via its flanges 11). In this configuration, bolt 33 (if used as coupling member for rollers 30, exemplified in FIG. 4) would be replaced with longer bolt 33a. In certain embodiments, as shown, spacer 34 can be further added to maintain the Mecanum wheel geometry.

The mobile device 2 of FIG. 7 is equipped with a matched set of four Mecanum wheels. As alluded to above, Mecanum wheel motion of mobile device 2 is achieved by a set of four wheels, two with +45° plates and two with −45° plates. In particular, wheels 1b and 1c use −45° plates and wheels 1a and 1d use +45° plates. To that end, it should be appreciated that the wheels 1b and 1c utilize the plate shown in FIG. 1, while the wheels 1a and 1d utilize the plate shown in FIGS. 2, 5, and 6. As additionally shown, each wheel (1a, 1b, 1c, and 1d) is situated relative to the mobile device 2 such that the tabs project inward toward the device 2. As would be appreciated (and as further alluded to here), angling the flanges 11 (via the tabs 11a) enables continuous flowing movement of mobile device 2 regardless of change of direction (characteristic of Mecanum wheels); however, the width of the device 2 is also effectively narrowed. As such, among other applications, the device 2 can be navigated in tight passageways or brought more proximate to areas for inspection/work activities.

Each wheel (1a, 1b, 1c, and 1d) is rotated using its own individual drive motor or motion actuator. Direction of motion of mobile device 2 is determined by forward and/or reverse motion of the wheels. In this way, the mobile device can be made to move sideways (strafe), diagonally or straight forward or straight backwards (reverse). For example, by rotating the wheels in the same direction (forward or reverse) at the same speed, mobile device 2 moves in that same direction at the same speed. Alternatively, by rotating wheels 1a and 1d reverse and wheels 1b and 1c forward, mobile device 2 will shift to the left. Conversely, by reversing those directions for the wheels, mobile device 2 will shift to the right. Furthermore, by rotating wheels 1a and 1c forward, and wheels 1b and 1d reverse, mobile device 2 will rotate in a clockwise (CW) direction. Conversely, by reversing the directions of those same wheels, the mobile device 2 rotate in a counterclockwise (CCW) direction. The wheel motions and corresponding mobile device 2 motion are summarized in Table 1 below.

TABLE 1

| Direction of Movement | Wheel Actuation |
| --- | --- |
| Forward | All Wheels Forward Same Speed |
| Reverse | All Wheels Reverse Same Speed |
| Strafe Left | Wheels 1b, 1c Forward; 1a, 1d Reverse |
| Strafe Right | Wheels 1b, 1c Reverse; 1a, 1d Forward |
| CW Rotate | Wheels 1a, 1c Forward; 1b, 1d Reverse |
| CCW Rotate | Wheels 1a, 1c Reverse; 1b, 1d Forward |

Although the present invention has been described in detail with regard to the exemplary embodiments thereof and accompanying drawings, it should be apparent to those skilled in the art that various modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof.

What is claimed is:

1. A wheel comprising:
a circular plate including a plurality of flanges arranged about a periphery of the plate, each of the flanges having an outer tab portion, the tab portions projecting laterally from the flanges at an angle of less than 60° from a plane of the plate, the tab portions defining lateral extensions about the plate's periphery; and
a plurality of rollers, each roller being supported by a corresponding one of the flanges, each roller extending from a corresponding one of the tab portions such that axis of rotation of each roller is at a corresponding angle of less than 90° from the plane of the plate.

2. The wheel of claim 1 wherein the plurality of flanges extend axially from the periphery of the plate.

3. The wheel of claim 2 wherein the plurality of flanges extend circumferentially about an outer ring of the plate, wherein a gap is defined between each flange and an outer ring of the plate.

4. The wheel of claim 3 wherein the gaps are defined between an outer edge of the plate outer ring and inner edges of the plurality of flanges.

5. The wheel of claim 1 wherein the plurality of flanges are uniformly spaced about the periphery of the plate.

6. The wheel of claim 1 wherein the tab portions are integral to the flanges.

7. The wheel of claim 1 wherein the tab portions project laterally from the flanges at an angle of approximately 45° from the plane of the plate, and the corresponding angle of axis of rotation of the rollers is approximately 45°.

8. The wheel of claim 1 wherein the rollers are mounted to the tab portions via fasteners.

9. The wheel of claim 8 wherein the fasteners comprise bolts passed within the rollers and secured via nuts retained within the rollers.

10. The wheel of claim 1 further comprising a further plate having two or more flanges arranged about a periphery of the further plate, the plurality of rollers extending between the circular plate and the further plate, each of the two or more flanges of the further plate supporting a corresponding one of the rollers extending from the circular plate such that the two or more rollers are jointly cantilevered between the circular plate and the further plate.

11. The wheel of claim 10 wherein the two or more flanges of the further plate are uniformly distributed over the further plates periphery.

12. A mobile device comprising:
a platform; and
at least four wheels, a first pair of the four wheels correspondingly situated on one side of the platform at front and back regions thereof, a second pair of the four wheels correspondingly situated on an opposing side of the platform at front and back regions thereof, each wheel comprising:
a circular plate including a plurality of flanges arranged about a periphery of the plate, each of the flanges having an outer tab portion, the tab portions projecting laterally from the plane of the plate at an angle of less than 90°; and
a plurality of rollers, each roller being supported by a corresponding one of the flanges, each roller extending from a corresponding one of the tab portions such that axis of rotation of each roller is a corresponding angle of less than 90° from the plane of the plate.

13. The mobile device of claim 12 wherein each wheel is situated relative to the platform such that their tab portions project inward toward the platform.

14. The mobile device of claim 12 wherein the wheel on the one side of the platform at the front region thereof and the wheel on the opposing side of the platform at the back region thereof comprising a first set of mirrored wheels.

15. The mobile device of claim 14 wherein the tab portions of the first set of mirrored wheels project laterally from the flanges at an angle of approximately 45° to the planes of their plates.

16. The mobile device of claim 14 wherein the wheel on the opposing side of the platform at the front region thereof and the wheel on the one side of the platform at the back region thereof comprise a second set of mirrored wheels.

17. The mobile device of claim 16 wherein the tab portions of the second set of mirrored wheels project laterally from the flanges at an angle of approximately −45° to the planes of their plates.

18. The mobile device of claim 16 wherein the tab portions of the first and second sets of mirrored wheels have same angle with respect to the planes of their plates, yet the tab portions of the first and second sets are oriented in opposing directions.

19. The mobile device of claim 18 wherein the angle is approximately 45°.

20. A wheel comprising:
a circular plate including a plurality of flanges arranged about a periphery of the plate, each of the flanges having an outer tab portion, the tab portions projecting laterally from the flanges at an angle of less than 90° from a plane of the plate, the tab portions defining lateral extensions about the plate's periphery;
a plurality of rollers, each roller being supported by a corresponding one of the flanges, each roller extending from a corresponding one of the tab portions such that axis of rotation of each roller is cantilevered from the plane of the plate; and
a further plate having two or more flanges arranged about a periphery of the further plate, the plurality of rollers extending between the circular plate and the further plate, each of the two or more flanges of the further plate supporting a corresponding one of the rollers extending from the circular plate such that the two or more rollers are jointly cantilevered between the circular plate and the further plate.

21. A wheel comprising:
a circular plate including a plurality of flanges arranged about a periphery of the plate and extending axially from the periphery of the plate, the plurality of flanges extending circumferentially about an outer ring of the plate wherein a gap is defined between each flange and an outer ring of the plate, each of the flanges having an outer tab portion, the tab portions projecting laterally from the flanges at an angle of less than 90° from a plane of the plate, the tab portions defining lateral extensions about the plate's periphery; and
a plurality of rollers, each roller being supported by a corresponding one of the flanges, each roller extending from a corresponding one of the tab portions such that axis of rotation of each roller is at a corresponding angle of less than 90° from the plane of the plate.

22. A wheel comprising:
a circular plate including a plurality of flanges arranged about a periphery of the plate, each of the flanges having an outer tab portion, the tab portions projecting laterally from the flanges at an angle of less than 90° from a plane of the plate, the tab portions defining lateral extensions about the plate's periphery; and
a plurality of rollers, each roller being supported by a corresponding one of the flanges, each roller extending from a corresponding one of the tab portions such that axis of rotation of each roller is at a corresponding angle of less than 90° from the plane of the plate;
wherein the rollers are mounted to the tab portions via fasteners, the fasteners comprising bolts passed within the rollers and secured via nuts retained within the rollers.

23. A wheel comprising:
a circular plate including a plurality of flanges arranged about a periphery of the plate, each of the flanges having an outer tab portion, the tab portions projecting laterally from the flanges at an angle of less than 90° from a plane of the plate, the tab portions defining lateral extensions about the plate's periphery;
a plurality of rollers, each roller being supported by a corresponding one of the flanges, each roller extending from a corresponding one of the tab portions such that axis of rotation of each roller is at a corresponding angle of less than 90° from the plane of the plate; and
a further plate having two or more flanges arranged about a periphery of the further plate, the plurality of rollers extending between the circular plate and the further plate, each of the two or more flanges of the further plate supporting a corresponding one of the rollers extending from the circular plate such that the two or more rollers are jointly cantilevered between the circular plate and the further plate.

* * * * *